United States Patent [19]

Vyvoda

[11] Patent Number: 5,290,852
[45] Date of Patent: Mar. 1, 1994

[54] GLUTARIC ACID BASED POLYESTER INTERNALLY PLASTICIZED PVC

[75] Inventor: Josef C. Vyvoda, Avon Lake, Ohio

[73] Assignee: The Geon Company, Independence, Ohio

[21] Appl. No.: 69,901

[22] Filed: Jun. 1, 1993

Related U.S. Application Data

[62] Division of Ser. No. 447,940, Dec. 8, 1989, Pat. No. 5,247,012.

[51] Int. Cl.$^5$ ................................................ C08K 5/05
[52] U.S. Cl. ................................ 524/766; 524/769; 524/773; 524/311; 525/11
[58] Field of Search ............... 524/766, 769, 773, 311; 525/11

[56] References Cited

U.S. PATENT DOCUMENTS

| | | | |
|---|---|---|---|
| 2,773,049 | 12/1956 | Cowee | 260/45.4 |
| 3,915,922 | 10/1975 | Suzuki et al. | 524/569 |
| 4,260,541 | 4/1981 | Kolinsky et al. | 525/11 |

FOREIGN PATENT DOCUMENTS

| | | | |
|---|---|---|---|
| 560036 | 7/1958 | Canada | 524/311 |
| 844310 | 8/1960 | United Kingdom | 524/569 |

*Primary Examiner*—John C. Bleutge
*Assistant Examiner*—Mark Sweet
*Attorney, Agent, or Firm*—Miles B. Dearth

[57] ABSTRACT

An internally plasticized polyvinyl halide obtained by the polymerization of a vinyl halide monomer in the presence of a polyester polymeric plasticizer substantially derived from glutaric acid and a diol. Articles made therefrom exhibit a unique balance of improved permanence, low plasticizer extraction high clarity and low haze. The polymers are particularly suitable for use in automotive interior parts or containers for blood components or foodstuffs.

7 Claims, 1 Drawing Sheet

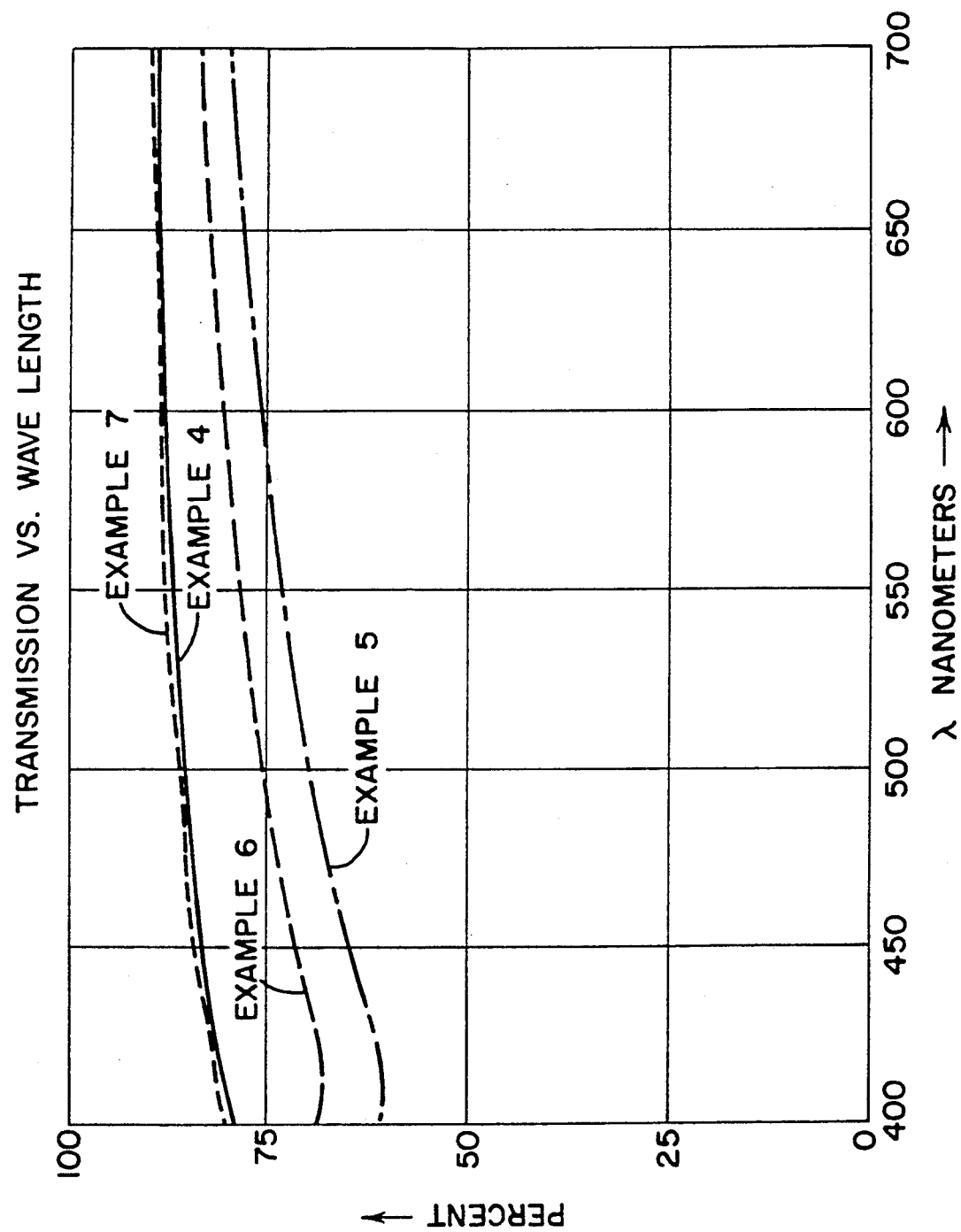

GLUTARIC ACID BASED POLYESTER INTERNALLY PLASTICIZED PVC

This is a divisional of application Ser. No. 07/447,940, filed Dec. 8, 1989, now U.S. Pat. No. 5,247,012.

TECHNICAL FIELD

This invention is directed to internally plasticized polyvinyl halide compositions. More specifically, this invention involves a method of internal plasticization whereby vinyl halide monomer or a mixture of vinyl halide monomer with one or more comonomers are polymerized in the presence of a polyester polymeric plasticizer.

STATE OF THE ART

It has been more than 63 years since it was first discovered that rigid polyvinyl chloride could be rendered flexible by way of plasticization. Since that time a vast array of compounding ingredients which provide plasticization of vinyl halide polymers have been found. These plasticizers can be fugitive or non-fugitive, monomeric or polymeric, reactive or non-reactive, primary or secondary. In addition to providing plasticization, they can impart a host of other useful properties to the vinyl halide polymers such as improved low temperature flexibility or fire retardancy.

The term "permanent plasticizer" refers to a non-fugitive plasticizer which has sufficiently low volatility as to exert its plasticization over an extended period of time and within a fairly broad range of operating conditions. Commonly used permanent plasticizers which are not polymeric and have relatively low molecular weights include phthalates, phosphates, succinates, citrates, epoxies and many derivatives within these classes. These broad classes are generally employed externally, that is, they are compounded into the preformed polymer to be plasticized. It is a general rule that a certain degree of miscibility or compatibility is required between the polymer and plasticizer to prevent separation of the plasticizer/polymer blend.

The search for improved permanence of plasticization properties and performance under broader operating conditions has resulted in the development of polymeric plasticizers or those which have significantly lower volatility such as epoxidized soy bean oil. Among the polymeric plasticizers are polyesters, polystyrene/acrylonitrile overpolymers on polybutadiene, ethylene vinyl acetate copolymers, ethylene/vinyl acetate/carbon monoxide terpolymers, polybutadiene/acrylonitrile, polyisobutylene, polyvinyl ethers and reactive or functionalized products of these.

Traditionally, external plasticization is carried out with a dry blending process, for instance, the mixing of suspension powders of rigid vinyl chloride with plasticizer compounds. Flexible compounds as well as rigid ones can be blended under shear and heat in a high intensity mixer, ribbon blender, mixer pelletizer combination, or continuous mixer-mill-cuber system to form pellets or cubes for ease of handling and processing. The combination of heat and work input during the mixing steps causes sufficient intimate contact between the plasticizer and the primary polymer, in this case vinyl halide polymer, to produce the desired plasticization. In aqueous emulsion polymer plasticization, typically extended agitation cycles and mixing of emulsified or neat plasticizer is carried out under indirect heat or steam sparging to effect softening and intimate contact and uptake of plasticizer within the polymer particles.

With the use of polymeric plasticizers, the aforesaid methods of plasticization have several shortcomings such as objectionably long mixing times in-process, difficulty in handling wet resin/plasticizer mixtures, undesirable levels of heat and work history exposure of the vinyl halide polymer, undesirable levels of plasticizer migration, incomplete homogeneity of the resin-plasticizer blend, and longer fusion time in melt processing.

The method of internal plasticization by incorporation of plasticizers, co-reactive plasticizing compounds or comonomers into the vinyl halide polymer during the polymerization process is a distinctly advantageous method. U.S. Pat. No. 2,773,049 issued to Cowee (December 1956) discloses a method of preparation of polymers of a wide variety of monoolefinic monomers and mixtures of monomers, in the presence of polyesters of dicarboxylic acids wherein at least a portion of the dicarboxylic component contains an ethylenic group in alpha-beta relationship to the carbonyl carbon. Those polyesters which contain a, $\beta$ unsaturation are interpolymerized into the primary monoolefinic monomer or mixture of monomers. U.S. Pat. No. 2,773,049 teaches the incorporation of certain esters of salicylic acid along with saturated or unsaturated polyesters and vinyl monomer during polymerization for the purpose of improving the color stability of the product obtained.

U.S. Pat. No. 4,260,541 (1981) granted to Kolinsky, et al. describes a method for producing internally plasticized polyvinyl chloride using polyester polymeric plasticizers prepared using dicarboxylic acids selected from the group consisting of adipic, sebacic and phthalic acid and diols having 2 to 8 carbon atoms in the molecule. The resulting internally plasticized polyvinyl chloride has improved long-term aging characteristics making it particularly useful as underground earth-insulating foils and improved resistance to extraction making it particularly useful for medical uses such as blood and infusion solution containers. Kolinsky, et al. suggests that a substantial portion of the polyester polymeric plasticizer is bound beyond molecular chain entanglement and probably is grafted by way of the alpha-position relative to a carbonyl group on the carboxylic acid component of the polyester. In laboratory studies of polyvinyl chloride polymerized using the suspension process in the presence of an adipic acid based polyester plasticizer, it is found that a prepared film of this composition exhibits substantially lower film clarity and higher haze than a conventional externally plasticized control sample using di 2-ethyl hexyl phthalate, for instance. In general, it is desirable to utilize a polymeric plasticizer, moreover an internal polymeric plasticizer in order to benefit from improved homogeneity, migration resistance, extractability and permanence of physical properties. However, there are limitations to the use of polymer compounds which exhibit poor film clarity and high percent haze in applications other than highly pigmented or opaque articles. It would correspondingly be desirable to utilize the improvements in properties aforementioned by internally incorporating a polyester polymeric plasticizer while at the same time maintaining the high degree of film clarity and low haze which is exhibited by many examples of conventional externally plasticized polyvinyl chloride utilizing lower molecular weight, hence less permanent, plasticizers such as di-2-ethylhexyl phthalate and the like.

SUMMARY OF THE INVENTION

Accordingly it is an aspect of the present invention to provide an internally plasticized vinyl halide polymer that exhibits low plasticizer migration, low extractability of plasticizer and excellent permanence of properties useful in articles requiring improved aging and weathering resistance, such as flexible components used in automobiles.

It is another aspect of this invention to provide an internal polymeric plasticized vinyl halide polymer which exhibits a high degree of film clarity and low percentage haze for clear or transparent articles of low pigmentation such as in medical applications, particularly as blood transmitting tubing and connectors, blood bags, I.V. bags and tubing and in food packaging, where film or sheet articles are employed such as food wrap or molded containers such as bottles and the like.

These and other aspects and advantages of this invention are accomplished herein, by the internally plasticized vinyl halide composition of the present invention comprising a polyester polymeric plasticizer substantially derived from the polyesterification of glutaric acid and a diol or polyol.

DESCRIPTION OF THE DRAWINGS

FIG. 1 represents a spectrophotometric plot representing the degree of light transparency of film specimens of examples 4-7. The Y-axis represents the percent luminous transmittance relative to a standard in air (taken as 100%) and is plotted against the X-axis representing the wavelength region from 400-700 nanometers.

DETAILED DESCRIPTION

The polyester plasticizers of the present invention used to internally plasticize polyvinyl halide resins are expressed by the general structural formula (I):

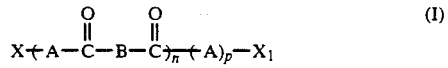

wherein A is a linear or branched polyol residue having from 2 to 10 carbon atoms and at least 2 oxy groups at its molecular ends, such as $-O-CH_2CH_2-O-$; P is either 0 or 1 with the proviso that when P is 0, $X_1$ is hydrogen B is a linear alkylene of 3 carbon atoms or is predominantly (>50%) present as a linear alkylene of 3 carbon atoms along with minor amounts of linear alkylenes of 2 and/or 4 carbon atoms or both; X and $X_1$ are hydrogen, acyl groups derived from monocarboxylic acids having from about 3 to 18 carbon atoms, a linear or branched alcohol or mixture of alcohols having from about 2 to 10 carbon atoms or a hydroxy-alkyl ester of a saturated hydrocarbon.

The preparation of the polyesters useful in this invention is accomplished according to well established commercial practice and will only be briefly outlined here. The polyesterification consists essentially of heating, preferably in an inert atmosphere, a mixture of glutaric acid or mixtures predominantly comprising glutaric acid or its anhydride, together with a diol or polyol (and optionally a chain terminator along with a suitable esterification catalyst) until such time as sufficient condensation reaction takes place.

Dicarboxylic acids sold commercially in some instances are found not to be in pure form with regard to the main component dicarboxylate. Typical commercial grade glutaric acid can include minor amounts (<50%) of succinic or adipic acid or both. Of particular interest in the present invention are those commercially available polyesters derived from glutaric acid or such mixtures available which comprise predominantly (>50%) glutaric acid.

The temperature of reaction is chosen to produce esterification at a reasonable rate measured by the evolution of water which is removed from the reaction as it progresses. Temperatures of reaction of 100° C. to 250° C. generally are employed. Suitable polyols include glycols, triols, higher polyols and similar polyhydric alcohols; or mixtures thereof.

Typical glycols are branched or linear glycols and include from 2 to about 10 carbon atoms. Specific examples of glycols include ethylene glycol; 1,2-propylene glycol; 1,3-propane diol; 1,4-butane diol; 2,2-dimethyl-1,3-propane diol; 1,3-butane diol; 1,6 hexane diol, 1,10-decane diol; diethylene glycol; triethylene glycol; dipropylene glycol; tripropylene glycol; glycerol; trimethylol propane; and similar diols and polyols; or mixtures thereof.

Suitable chain terminators are hydroxy-alkyl esters or monobasic carboxylic acids or mixtures. Suitable hydroxy-alkyl esters include, for example, hydroxyethyl methacrylate, hydroxyethyl acrylate, hydroxypropyl methacrylate, hydroxypropyl acrylate and similar hydroxyalkyl esters; or mixtures.

Suitable chain terminating monobasic carboxylic acids include monobasic carboxylic acids containing from about 3 to about 18 carbon atoms including, for example, but not limited to, acrylic acid, acrylic acid anhydride, methacrylic acid, methacrylic acid anhydride, crotonic acid, 2-ethylhexoic acid, saturated and unsaturated fatty acids derived from natural animal and vegetable sources such as coconut oil fatty acids or tallow fatty acids, like $C_6$ to $C_{18}$ fatty acids derived from the hydrolysis of coconut oil or tallow; or mixtures thereof.

Optional chain terminators consist of reaction products of monobasic carboxylic acids, such as crotonic acid, and other compounds such as alcohols or polyols. Examples of such products include esters such as neopentyl glycol dicrotonate, propylene glycol dicrotonate, hexanediol diacrylate, and similar esters.

In the preparation of the internally plasticized polyvinyl halide compositions of the present invention, vinyl halide is polymerized in the presence of a polyester plasticizer derived from glutaric acid. The amount of the plasticizer present can be anywhere from 1 to 100 parts by weight plasticizer per 100 parts by weight of polyvinyl halide polymer depending on the level of flexibility or softness desired in the resulting polymer. Preferably, the amount of plasticizer present is from 1 to about 50 parts by weight per 100 parts by weight of polyvinyl halide polymer. In addition to introducing the polyester plasticizer directly into the reactor with the vinyl monomer or monomer mixture the plasticizer can be premixed with vinyl monomer or monomer mixture prior to charging to the reactor. The premix method is preferred. Charging the monomer mixture into the vessel can be accomplished by single batchwise addition or metered proportioning. Single batch charging of the monomer/plasticizer premix is preferable.

One or more other polymerizable monomers can be copolymerized with the vinyl halide monomer and polyester plasticizer mixture. Other vinyl halides in addition to vinyl chloride are, for example, vinyl fluoride, vinyl bromide, vinylidene fluoride, and vinylidene chloride. In addition, other polymerizable olefinic monomers having at least one terminal $CH_2=C<$ grouping can be used. Such olefinic monomers include $\alpha,\beta$-olefinically unsaturated carboxylic acids, such as acrylic acid, methacrylic acid, ethacrylic acid, $\alpha$-cyanoacrylic acid, and the like; esters of acrylic acid, such as methyl acrylate, ethyl acrylate, butyl acrylate, octyl acrylate, 2-ethylhexyl acrylate, cyanoethyl acrylate, and the like; esters of methacrylic acid, such as methyl methacrylate, butyl methacrylate, and the like; ethylenically unsaturated di- or tri-carboxylic acids, their corresponding anhydrides and their corresponding $C_1$-$C_{20}$ monoalkyl and dialkyl esters. Specific examples of such acids are aconitic acid, fumaric acid, maleic acid, itaconic acid, citraconic acid, maleic anhydride, dibutyl fumarate and monoethyl maleate; ethylenically unsaturated nitriles, such as acrylonitrile, methacrylonitrile, and the like; ethylenically unsaturated amides such as acrylamides, methyl acrylamide, N-methylol acrylamide, N-butoxy methacrylamide, and the like; vinyl ethers, such as ethyl vinyl ether, chloroethyl vinyl ether, and the like; vinyl ketones such as methyl vinyl ketone; aromatic olefins such as styrene, and styrene derivatives, such as $\alpha$-methyl styrene, vinyl toluene, chlorostyrene, vinyl naphthalene, and the like; allyl and vinyl chloroacetate, vinyl acetate, vinyl pyridine, and diolefins including butadiene, isoprene, chloroprene, and the like. The level of polymerizable comonomer should be no greater than about 50%, preferably no greater than 20% by weight, based on the weight of the monomer mixture including the vinyl halide, the polyester plasticizer and any optional polymerizable comonomers. The amount of copolymerizable monomer preferably is present in minor amounts. More preferably, the polyvinyl chloride polymers of this invention are polyvinyl chloride homopolymers. The invention will be described in terms of a polyvinyl chloride homopolymer polymerized in the presence of a polyester which substantially comprises the polyesterification of glutaric acid, glutaric acid anhydride or mixtures comprising >50% glutaric acid with succinic or adipic acid or both thereof and a diol having 2 to 8 carbon atoms in the molecule.

The polymerization processes for preparing the vinyl chloride, glutaric acid based polyester polymerization mixture can be carried out by employing any one of the mass, bulk, aqueous suspension or emulsion processes. In the mass process, vinyl chloride is normally polymerized in the absence of additives except for the subject polyester plasticizer and suitable catalyst. The mass process is also conducted in the substantial absence of water. The method of conversion of monomer involves preferably a two reactor, 2-step process, the first step being agitation in the first vessel at high turbulence and the second step being mild agitation in the second vessel while maintaining uniform temperature of the mass. The reaction mixture normally is transferred from the first vessel into the second vessel after the reaction has proceeded to only about 7 to 15% completion in the first vessel. A mass process of this type is described in U.S. Pat. No. 3,522,277 the disclosure of which is incorporated herein by reference.

Internally plasticized vinyl chloride resins of this invention also can be prepared by a phase inversion polymerization process. By this process the initial polymerization occurs while the vinyl monomer and polyester plasticizer solution is the continuous phase. After conversion proceeds to about 10%, additional water is added to the point whereby a phase inversion occurs and the water becomes the continuous phase with the monomer or organic phase becoming the dispersed phase. The phase inversion process is described in U.S. Pat. No. 3,706,722, the disclosure thereof being incorporated herein by reference.

The preferred method for the polymerization of the polyester plasticized vinyl chloride polymers of the present invention is the aqueous suspension process.

The aqueous suspension process utilizes a free radical polymerization mechanism that uses a monomer soluble initiator which decomposes under the reaction conditions to form free radicals. Suitable classes of monomer soluble initiators that may be employed are peroxides, diperoxides, monohydroperoxides, azo compounds, peroxyesters, percarbonates and the like. Specific examples of these include, but are not limited to, benzoyl peroxide, lauryl diperoxide, cumene hydroperoxide, azo-bisisobutyronitrile, di-isopropyl peroxydicarbonate, di(sec-butyl) peroxydicarbonate (SBP), acetyl cyclohexane sulfonyl peroxide, or mixtures thereof. Usually the amount of catalyst employed is in the range of about 0.005 percent to about 1 percent by weight, based on the weight of the polymerizable monomer or monomers. Preferably the amount of catalyst used ranges from about 0.02 to 0.12 parts per hundred parts of vinyl monomer (phm).

In the aqueous suspension medium of the present method, water (preferably demineralized water) is the continuous phase while vinyl halide monomer, more preferably a mixture of monomer with polymeric plasticizer, is the discontinuous or dispersed phase. A vinyl halide monomer to water ratio in the range of about 1.0:1.0 to 1.0:10.0 may be used, although a water ratio from 1.0:1.0 to 1.0:4.0 is preferred.

Aqueous dispersing agents or mixtures of dispersing agents and surfactants also are used so as to stabilize the dispersed polymer particles under agitation in order to control the level of agglomeration and avoid loss of colloidal suspension. Significant agglomeration of polymer is undesirable. Any of the well known surfactants and dispersants useful in aqueous media polymerization may be employed. They include, among others, the cellulosic class of water soluble dispersants, polyvinyl alcohol, hydrolyzed polyvinyl acetates, polyacrylic acid polymers, sodium lauryl sulfonate, polyethylene oxide containing surfactants and non-polyethylene oxide surfactants. The amount of dispersant or mixture of dispersants typically employed is from about 0.01 percent to about 1.0 php, preferably from about 0.02 to 0.15 phm.

The temperature of the mildly exothermic polymerization desirably is kept relatively constant and may be controlled by heat exchange coils or jackets within a range of about 0° C. to about 80° C., preferably 40° C. to 70° C., depending on the particular monomer mixture and catalyst employed. The novel resins of the present invention are isolated from the reaction media by recovery and drying methods. The dried polymer obtained is a solid free flowing powder. The free flowing powder can be blended with other materials commonly employed in producing compounds. This blend can be further heated and fused into small pellets for convenience in subsequent molding operations. Alternatively the free flowing powder can be heated and fused into pellets before the addition of any other ingredients commonly employed in producing compounds.

The particle size of the resin can be controlled to an advantageous size, ranging from sub-micron size in the case of emulsion polymerized resin to about 1000 microns. A weight average particle size from about 70 microns to about 400 microns for suspension resin is preferred.

An important basic advantage of the present invention is the elimination of compounding and mixing of polyvinyl chloride with a polymeric polyester plasticizers since these are viscous and are absorbed slowly. In fact, some mixtures can not be driven to complete dryness and some liquid/polymer agglomerates may persist which greatly interfere with handling as well as clogging the equipment used in handling such polymers. For practical reasons, in conventional compounds, only resins which have a high degree of porosity are suitable for dry mixing of polyester polymeric plasticizers. Owing to the advantages of the present invention, the requirement of highly porous homopolymer resins virtually is eliminated.

It also is anticipated that other types of plasticizers may be optionally incorporated as minor constituents into the polymerization mixture. Those plasticizers which do not exhibit any appreciable chain transfer functionality are preferred such as epoxidized soybean oil and epoxidized linseed oil (ELO).

The following examples will demonstrate the present invention and are not intended to limit the scope of this invention.

It should be understood that in the following examples, and elsewhere in the present specification and claims, all percentages and all parts are intended to express percent by weight and parts by weight based on the weight of the vinyl halide polymer unless otherwise clearly indicated.

TABLE 1

| Ingredient | Parts by Weight Examples | | |
|---|---|---|---|
| | 1 | 2 | 3 |
| Geon ® 110X500 PVC Resin | 100 | — | — |
| Water (demineralized) | — | 188 | 188 |
| Vinyl Chloride Monomer (VCM) | — | 70 | 70 |
| Polyester (Adipic)[1] | — | 30 | — |
| Polyester (Glutaric)[2] | — | — | 30 |
| Dispersant[3] | — | .03 | .03 |
| Dispersant[4] | — | .08 | .08 |
| Initiator (SBP) | — | .03 | .04 |
| Poly Temperature °C. | — | 40 | 55 |
| VCM Conversion | — | 61% | 58% |
| Inherent Viscosity (I.V.) | 1.06 | 0.66 | 0.48 |
| Wgt. Average Particle Size | 141 u | 164 u | 181 u |
| Porosity (Hg) ml/gm | .35 | .257 | .058 |
| Percent Plasticizer in final product | — | 40.9% | 42.5% |

[1]Paraplex ® G-57 available from C. P. Hall Co., Chicago, IL
[2]Plasthall ® 550 available from C. P. Hall Co., Chicago, IL
[3]Hydroxypropyl ether of cellulose
[4]Hydroxypropyl ether of methyl cellulose

EXAMPLES 1–3

The resin of Example 1 is that of a suspension polymerized polyvinyl chloride homopolymer which is commercially produced by The B.F.Goodrich Company and was used as a control resin which was further compounded as in Table 2. Example 2 represents the preparation of an internally plasticized vinyl chloride polymer polymerized with an adipic acid based polyester polymeric plasticizer. Example 3 of illustrates the preparation of an internally plasticized vinyl chloride polymer polymerized with a glutaric acid based polyester of the present invention. The polymerization reactions were conducted in a reactor equipped with temperature control and agitation means. The vinyl chloride/polyester plasticizer premixtures of Examples 2 and 3 were charged into the polymerization reactor containing the demineralized water and dispersants. A polymerization initiator then was added to the reactor. The polymerization was conducted with agitation at 700 RPM at the temperature indicated. During the course of the reaction, additional demineralized water was injected into the reactor. The reaction was allowed to proceed and at a specified time the reaction was stopped. The percentage of vinyl monomer conversion is given in Table 1. It is for purposes of experimental standardization and convenience to convert the monomer charged to these levels but is not meant to indicate a restriction nor a preferable level of conversion in commercial practice. The resulting resin then was stripped of residual monomer and dried at 70° C.

EXAMPLES 4–7

Preparation of film plaques in Examples 4–7 were made from the polymers of Examples 1–3. The materials were prepared first by compounding in additional ingredients suitable for typical commercial processing. These ingredients were mixed in a Henschel mixer before being milled on a 2-roll mill. Table 2 identifies the ingredients used in the compounded resins of Examples 4–7.

The control compound, Example 4 demonstrates external plasticization using a combination of di-2-ethylhexyl phthalate (DEHP) and ELO along with conventional heat stabilizers and lubricants. The adipic acid based polyester plasticizer used in making the PVC resin of compound Examples 5 and 6, commercially designated Paraplex G-57, has an advertised molecular weight average of 3300. The glutaric acid based polyester used to prepare the PVC resin compounded in Example 7, commercially designated Plasthall 550 has an advertised molecular weight of 2500. The advertised refractive index of both Paraplex G-57 and Plasthall 550 is at 1.466.

The compositions of Examples 4–7 were heated and fused on the 2-roll mill for 5 minutes at the temperatures given in Table 2 on the same roll mill. Bands from the mill then were compression molded in a heated hydraulic press at 175° F. for 5 minutes and prepared for measurement of the luminous transmittance (employing the procedure described in ASTM D-1746) using an ACS Model 1400 spectrophotometer. FIG. 1 is a plot of the Y-axis values represent the percent transmittance versus wavelength on the axis film clarity of plaques made from Examples 4–7 relative to a calibrated standard for each specimen measured.

The % haze was determined. The method used is nearly identical to the procedure set forth in ASTM D-1003-61 except for the use of a Hunterlab Model Spectrophotometer and an improved standardization method which enhances the correlation of the standard reference and the specimen. The formula employed was:

$$\% \text{ haze} = \frac{T_t - T_s}{T_t} \times 100$$

where $T_t = Y$ transmission value taken at the sphere port and $T_s = Y$ transmission value taken at the lens. The resulting % haze for each example calculated using the aforesaid formula are:

| Example | Type Resin | % Haze |
|---------|------------|--------|
| 4 | Control DOP | 5.49 |
| 5 | Adipic/PVC & ELO | 19.76 |
| 6 | Adipic/PVC | 16.3 |
| 7 | Glutaric/PVC | 5.35 |

The difference between % haze of Examples 5 and 6 compared with Example 7 is unexpected and substantial. Additionally, the difference in % haze between example 6 and 7 is greater than would be predicted based on the similarities in compositions, plasticizer molecular weights, method of preparation and particularly surprising since the refractive index of the two types of polyesters is identical. In addition to unexpected low haze, it is found that the compound of Example 7 exhibits substantially improved clarity over Examples 5 and 6 as can be seen in FIG. 1. This substantially improved clarity exhibited by Example 7 over Example 6 is entirely due to the presence of the polyester based on glutaric acid. Such a significant difference in clarity would not be predicted or expected when the only apparent significant difference between the two polyester polymers is the particular di-carboxylic acid backbone component. Moreover, the polymeric polyester plasticized polyvinyl chloride composition of Example 7 exhibits substantially equal clarity to the control DOP externally plasticized homopolymer PVC. The film clarity and haze of the composition of Example 7 presumably is due in part to the apparently improved compatibility between the polyvinyl chloride polymer and the polyester plasticizer of the present invention.

TABLE 2

| | Examples | | | |
|---|---|---|---|---|
| | Example | | | |
| | 4 phr | 5 phr | 6 phr | 7 phr |
| Resin | | | | |
| Example 1 | 100 | — | — | — |
| Example 2 | — | 100 | 100 | — |
| Example 3 | — | — | — | 100 |
| DEHP | 44 | — | — | — |
| ELO | 14.5 | 14.5 | — | — |
| Ca/Zn | 0.2 | 0.2 | 0.2 | 0.2 |
| Stabilizer | 0.4 | 0.4 | — | — |
| Lubricant | | | | |
| Mill Temp (°F.) | 292° F. | 292-277° F. | 270° F. | 272° F. |
| Mill Time | 5 Min. | 5 Min. | 5 Min. | 5 Min. |

What is claimed is:

1. A process for producing internally plasticized polyvinyl halide particles containing a polyester polymeric plasticizer wherein said polyester polymeric plasticizer is substantially derived from the polyesterification of glutaric acid and a diol or polyol said plasticizer having the formula:

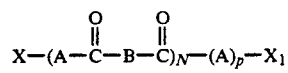

wherein A is a linear or branched polyol residue having from about 2 to 10 carbon atoms and at least 2 oxy groups at its molecular ends; P is 0 or 1 with the proviso that when P is 0, $x_1$ is hydrogen; B is a linear alkylene of 3 carbon atoms or is predominantly present as a linear alkylene of 3 atoms along with minor amounts of linear alkylenes of 2 or 4–10 carbon atoms or a combination thereof; X and $X_1$ independently are hydrogen, or acyl groups derived from monocarboxylic acids having from about 3 to 18 carbon atoms, a linear or branched alcohol or mixture of alcohols having from about 2 to 10 carbon atoms, or a hydroxy-alkyl ester of a saturated hydrocarbon; n is an integer of from 1 to about 25 and the average range of molecular weight of said polyester plasticizer is no more than about 5000 said polymerization process comprises (A) polymerizing vinyl halide monomer in the presence of said polyester polymeric plasticizer to a vinyl monomer conversion level of at least 50% to form internally plasticized polyvinyl halide particles containing said polyester polymeric plasticizer;

(B) removing substantially all of the residual vinyl halide monomer from said internally plasticized polyvinyl halide particles; and (C) drying said internally plasticized polyvinyl halide particles to yield a free flowing dry powder.

2. The process of claim 1 wherein the polymerization is carried out at a temperature of from about 40° C. to about 70° C.

3. The process of claim 1 wherein said process is conducted in an agitated aqueous medium.

4. The process of claim 1 wherein said process is conducted in the substantial absence of water.

5. The process of claim 3 wherein said polyester polymeric plasticizer is mixed with the vinyl halide monomer prior to charging to the aqueous suspension medium.

6. The process of claim 3 wherein a portion of said polyester polymeric plasticizer is pre-mixed with vinyl halide monomer and the remaining plasticizer is proportioned into the aqueous suspension medium during polymerization.

7. The process of claim 3 wherein the polyester polymeric plasticizer is proportioned into the aqueous suspension medium containing polymerizing vinyl halide monomer.

* * * * *